ns Patent [19]

Muenger et al.

[11] 4,326,856
[45] * Apr. 27, 1982

[54] PRODUCTION OF CLEANED AND COOLED SYNTHESIS GAS

[75] Inventors: James R. Muenger, Beacon; Edward T. Child, Tarrytown; Albert Brent, Huntington, all of N.Y.

[73] Assignee: Texaco Development Corporation, White Plains, N.Y.

[*] Notice: The portion of the term of this patent subsequent to Feb. 17, 1998, has been disclaimed.

[21] Appl. No.: 172,747

[22] Filed: Jul. 28, 1980

Related U.S. Application Data

[63] Continuation-in-part of Ser. No. 43,918, Mar. 30, 1979, Pat. No. 4,251,228.

[51] Int. Cl.³ .............................................. C10K 1/02
[52] U.S. Cl. .................................. 48/197 R; 48/206; 55/1; 252/373
[58] Field of Search ...................... 48/197 R, 206, 202, 48/DIG. 2, 203, 201, 210; 252/373; 60/39.02; 122/5; 201/38; 55/1, 444, 464, 446

[56] References Cited

U.S. PATENT DOCUMENTS

| | | | |
|---|---|---|---|
| 1,527,235 | 2/1925 | Taylor | 55/446 |
| 1,744,314 | 1/1930 | Kirkpatrick | 55/444 |
| 2,716,598 | 8/1955 | Moses | 48/202 |
| 2,961,310 | 11/1960 | Steever | 48/206 |
| 3,957,465 | 5/1976 | Pircon | 55/446 |
| 4,074,981 | 2/1978 | Slater | 48/197 R |
| 4,081,253 | 3/1978 | Marion | 252/373 |
| 4,220,469 | 9/1980 | Tippwer | 48/202 |
| 4,251,228 | 7/1981 | Nuenger et al. | 48/197 R |

FOREIGN PATENT DOCUMENTS

| | | | |
|---|---|---|---|
| 2650512 | 5/1978 | Fed. Rep. of Germany | 48/DIG. 2 |
| 2735565 | 2/1979 | Fed. Rep. of Germany | 48/206 |
| 673164 | 6/1952 | United Kingdom | 48/202 |

Primary Examiner—S. Leon Bashore
Assistant Examiner—Michael L. Goldman
Attorney, Agent, or Firm—Carl G. Ries; Robert A. Kulason; Albert Brent

[57] ABSTRACT

The hot raw synthesis gas stream leaving the reaction zone of a free flow partial oxidation gas generator at a temperature in the range of about 1800° to 3000° F. is passed through a first gas diversion and residue separation chamber where the velocity of the gas stream is reduced and its direction is diverted into a side transfer line. Solid material and molten slag separate by gravity from the gas stream. The hot gas stream is then introduced into second gas diversion and residue separation zone comprising at least one thermally insulated gas-solids impingement separation means were additional solid matter and slag is separated. For example, from about 2 to 8 thermally insulated gas-solids impingement separators may be employed which are connected in parallel and/or series. In one embodiment, about 0 to 20 vol. % of the hot gas stream may be passed through bottom outlets in said first and second gas diversion zones in order to prevent bridging. The hot gas stream from the second gas diversion zone is passed upwardly through a radiant cooling zone where additional solid matter is removed by gravity and the gas temperature is reduced to a temperature in the range of about 900° to 1800° F.

26 Claims, 4 Drawing Figures

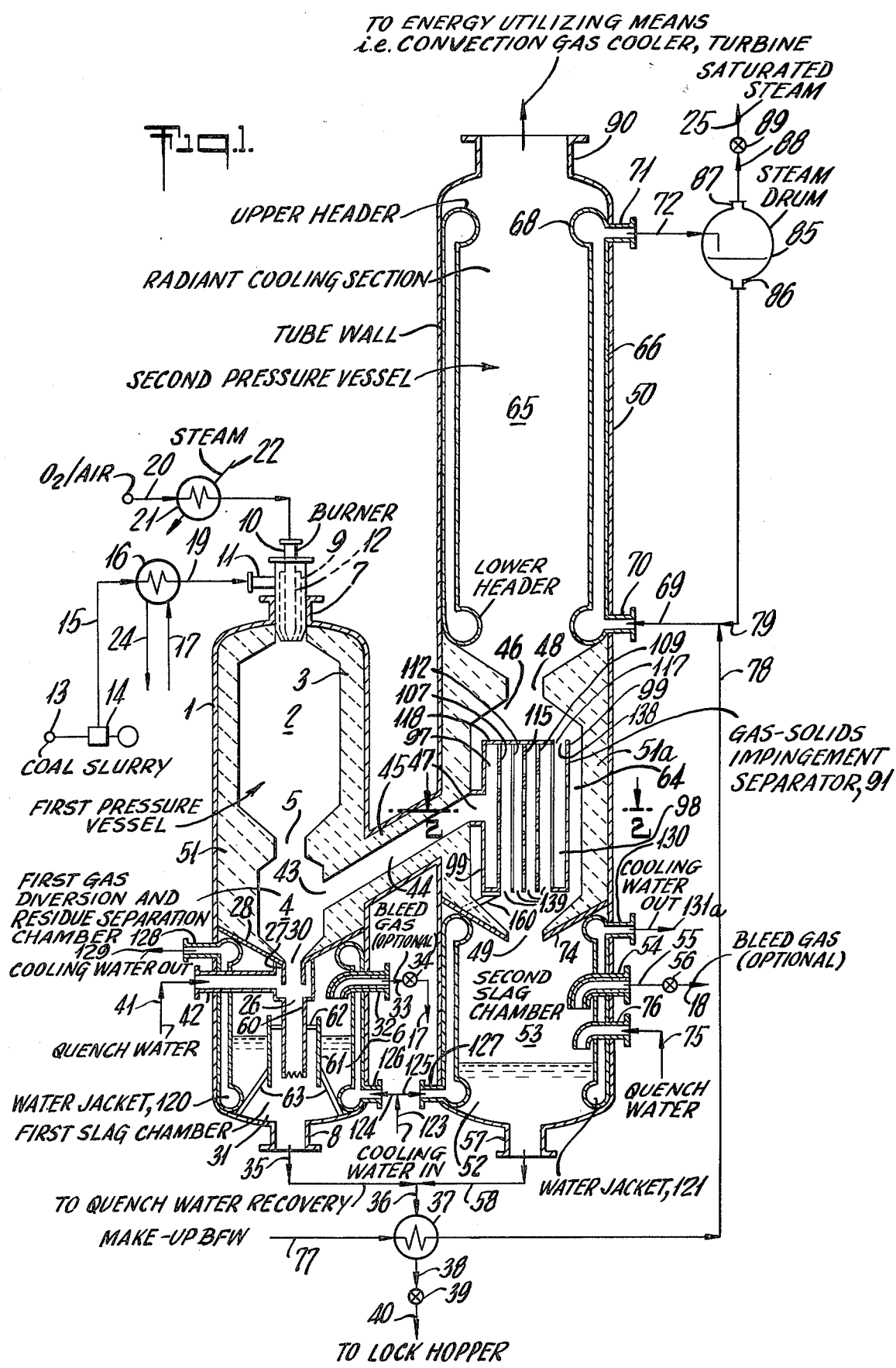

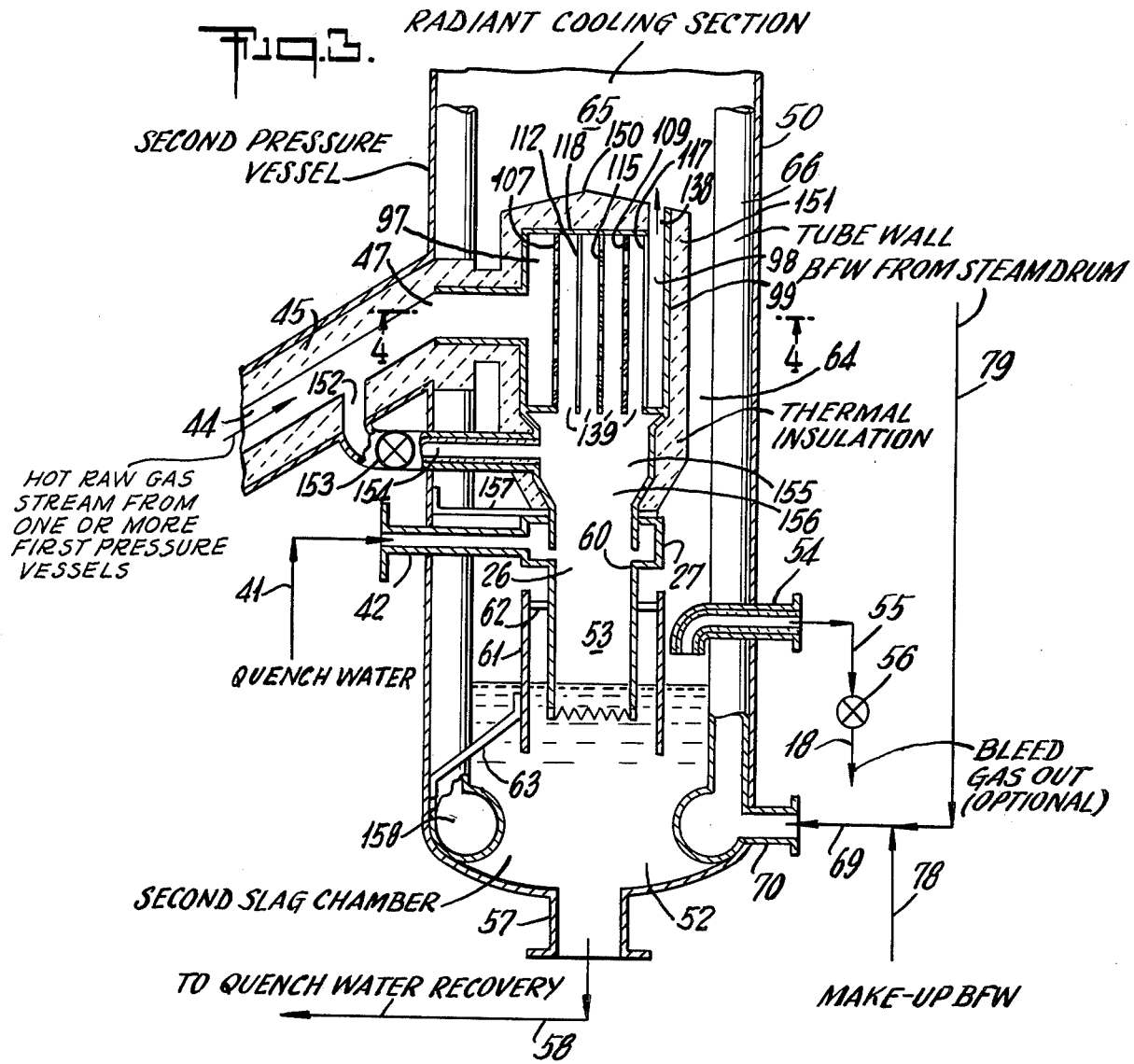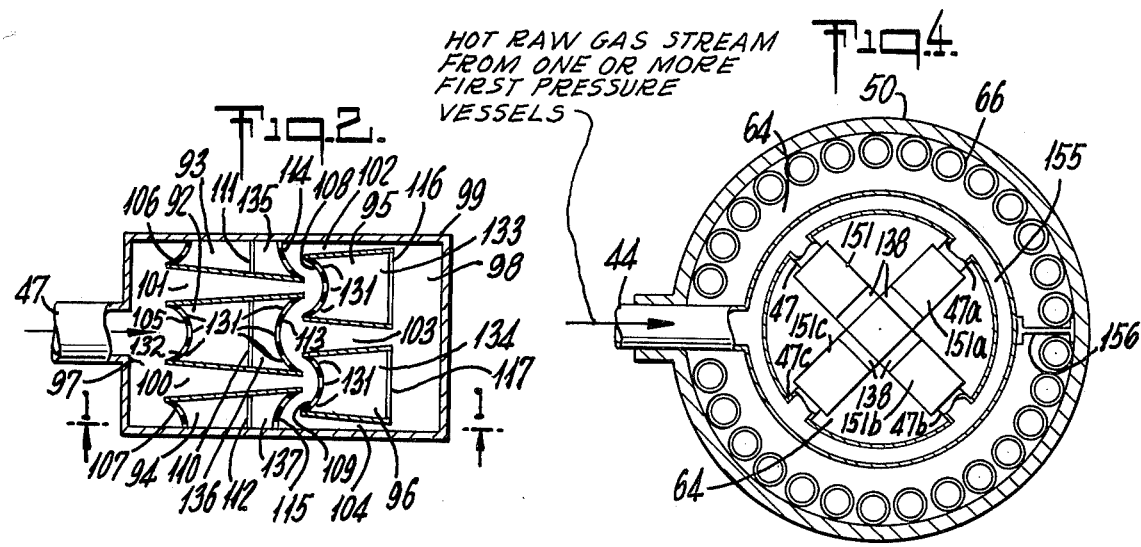

PRODUCTION OF CLEANED AND COOLED SYNTHESIS GAS

This application is a continuation-in-part of the patent application Serial No. 043,918, filed May 30, 1979 and which issued on Feb. 17, 1981 as U.S. Pat No. 4,251,228.

BACKGROUND OF THE INVENTION

1. Field of the Invention

This invention relates to the manufacture of cleaned and cooled gaseous mixtures comprising $H_2$ and $CO$. More particularly it pertains to a process for producing a cleaned and cooled stream of synthesis gas, fuel gas, or reducing gas by the partial oxidation of ash containing solid carbonaceous fuels.

2. Description of the Prior Art

Various amounts of molten slag and solid matter such as soot and ash are contained in the hot raw gas stream leaving a partial oxidation generator in which solid hydrocarbonaceous fuels such as coal are reacted with steam and free oxygen to produce gaseous mixtures comprising carbon monoxide and hydrogen. The life of such equipment as gas coolers, compressors, and turbines that are contacted downstream by the hot raw gas stream, may be increased by removing entrained solids from the gas stream. Solids removal from a raw synthesis gas stream will prevent plugging of catalyst beds. Further environmentally acceptable fuel gas may be produced.

In co-assigned U.S. Pat. No. 2,871,114 to Du Bois Eastman, the hot raw gas stream leaving the gas generator is passed first through a slag pot and then into a water quench tank. Not only is the raw gas stream leaving the quench tank saturated with water, but all of the sensible heat in the gas stream is dissipated in the quench water at a comparatively low temperature level. In U.S. Pat. No. 4,054,424 no means is provided for removal of the slag from the system. This differs from the subject invention by which entrained residue from the partial oxidation process is removed from the raw synthesis gas without quenching all of the hot raw gas stream in water or other coolant.

SUMMARY

This invention pertains to a process for the partial oxidation of the ash containing solid carbonaceous fuel, such as coal, for producing a cleaned and partially cooled stream of synthesis gas, fuel gas, or reducing gas. A solid carbonaceous fuel is reacted with a free-oxygen containing gas, with or without a temperature moderator, in a down-flow refractory lined noncatalytic free-flow gas generator at a temperature in the range of about 1800° to 3000° F. and a pressure in the range of about 10 to 190 atmospheres to produce a raw gas system comprising $H_2$, $CO$, $CO_2$. and one or more materials from the group $H_2O$, $H_2S$, $COS$, $CH_4$, $NH_3$, $N_2$, $A$, and containing molten ash and particulate matter. Most of the combustion residue entrained in the hot raw gas stream leaving the reaction zone is removed and the temperature of the raw gas stream is reduced to a temperature in the range of about 900° to 1800° F. by means of the subject process. By this means fouling of the tubes of a downstream convection type waste heat boiler may be avoided. Further, the life of such downstream equipment as compressors and turbines may be increased. Removing entrained solids from the raw synthesis gas stream will prevent plugging of downstream catalyst beds. Removal of the entrained solids from the hot raw gas stream mainly takes place in two separate gas diversion and residue separation zones. The gas stream is then passed upwardly through the central unobstructed vertical passage of a vertical tubewall cooled radiation section where additional solid matter is removed by gravity and the temperature of the gas stream is reduced. In one embodiment of the process, the second gas diversion and residue separation zone contains at least one high temperature resistant gas-solids impingement separator. In still another embodiment, the second gas diversion and solid separation means comprises at least one impingement separator, such as a plurality of impingement separators connected in parallel or series.

The subject process is carried out in two separate vertical pressure vessels. The upper portion of the first vessel contains the refractory lined reaction zone of the gas generator which is directly connected at the bottom to the first gas diversion and residue separation zone. The hot raw gas stream undergoes a change in velocity and direction in the first gas diversion and solids separation chamber. Solid residue and slag entrained in the gas stream passes through an outlet in the bottom of the first diversion chamber and drops by gravity into a pool of water contained in the bottom of the first vessel. Optionally, a comparatively small stream of bleed gas i.e. about 0-20 vol. % of the hot gas stream from the reaction zone is passed through the bottom outlet in the first diversion chamber and is removed from the vessel. This stream of hot gas prevents bridging of said bottom outlet with solid matter and slag. Optionally, a vertical dip tube is connected to said bottom outlet for discharging into said pool of water and quench cooling said bleed gas stream and/or the material separated in said first diversion chamber. The second vertical pressure vessel is located close to and parallel to the first vertical vessel. The upper portion of the second vertical vessel consists of a tube-wall cooled radiant section. In the embodiment in which the second gas diversion and solid separation means comprises at least one impingement separator, the tube-wall may extend down the entire length of said second vessel. The second gas diversion and residue separation zone or chamber is located directly beneath the upper radiant cooling section, and is connected to the first diversion zone by way of a transfer line. Changes in the direction and velocity of the hot gas stream take place in the second gas diversion and solids separation zone. Solid matter and/or slag separated in the second diversion zone may drop through an outlet in the bottom of the second diversion zone and optionally through a dip tube into a pool of water contained in the bottom of the second vessel. Optionally, a small stream of hot bleed gas i.e. from about 0-20 vol. % of the gas stream passing through the refractory lined transfer tube is passed through the bottom exit orifice of the second residue separation chamber, or through the bottom exit passage in at least one of a plurality of impingement separators. Bridging of the exit passages and orifices with solid matter and/or slag is thereby prevented. Optionally, a dip tube for discharging under quench water said bleed gas stream and/or the separated material, may be connected to said bottom exit orifice. In a preferred embodiment, the hot water containing solids removed from the bottoms of the two vessels is passed in indirect heat exchange with boiler feed water. By this means the boiler feed water is preheated before it is introduced into the tube wall of the radiant cooling section as a portion of the coolant.

BRIEF DESCRIPTION OF THE DRAWING

The invention will be further understood by reference to the accompanying drawing in which:

FIG. 1 is a schematic drawing which shows an embodiment of the subject process in which the refractory lined second gas diversion and solids separation zone contains at least one gas-solids impingement separator.

FIG. 2 is a cross-section of the gas-solids impingement separator in FIG. 1 taken at 2.

FIG. 3 is a schematic drawing which shows an embodiment of the subject process in which the second gas diversion and solids separation means consists of a high temperature refractory insulated gas-solids impingement separator.

FIG. 4 is a cross section of the embodiment depicted in FIG. 3 taken at 4 but showing a plurality of gas-solids impingement separators connected in parallel.

DESCRIPTION OF THE INVENTION

The present invention pertains to an improved continuous process and related apparatus for cleaning and cooling a hot raw gas stream from a free flow non-catalytic partial oxidation gas generator. The hot raw gas stream principally comprises $H_2$, $CO$, $CO_2$, and one or more materials from the group $H_2O$, $H_2S$, $COS$, $CH_4$, $NH_3$, $N_2$, $A$, and containing entrained solid matter and molten ash. The hot raw gas stream is made by the partial oxidation of an ash containing solid carbonaceous fuel, such as coal i.e. anthracite, bituminous, sub-bituminous, or lignite. One ton of coal contains the same amount of energy as three to four barrels of crude oil. Accordingly, coal is the most promising material to replace the dwindling world-wide oil and natural reserves. One third of the world's economically recoverable coal reserves are located in the United States. There is enough coal in the United States to last more than 200 years.

Ground solid fuel is introduced into the gas generator either alone or in the presence of a substantially thermally liquifiable or vaporizable hydrocarbon or carbonaceous material and/or water, or entrained in a gaseous medium such as steam, $CO_2$, $N_2$, recycle synthesis gas, and air. Vaporizable hydrocarbons include by definition petroleum distillates and residue, oil derived from coal, shale oil, crude petroleum, gas oil, tar sand oil, cycle gas oil from fluid-catalytic cracking operation, furfural extract of coker gas oil, and mixtures thereof. Solid carbonaceous fuel includes by definition particulate carbon, coal, coke from coal, lignite, petroleum coke, oil shale, tar sands, asphalt, pitch and mixtures thereof.

By means of the subject invention the combustion residues entrained in the raw gas stream from the reaction zone of the gas generator may be reduced to an acceptable level of concentration and particle size so that the hot gas stream may be used in downstream heat exchange equipment, or in other devices which utilize the energy contained in the hot gas stream. The recovery of thermal energy from the raw gas stream leaving the reaction zone of the partial oxidation gas generator is made difficult by the presence in the generator exhaust gases of combustion residues including particulate solids and droplets of molten slag which result from the fusion of the ash content of the coal fed to the gas generator. The concentration of solids in the hot raw gas stream may be in the range of about 0.1 to 4 grams per standard cubic foot (SCF). The particle size may be in the range of about 40 to 1000 micrometers or larger. Unless removed, slag and particulate matter entrained in the hot gas stream, will deposit out and foul heat exchange surfaces. The thermal efficiency of the process will be thereby impaired.

By the instant invention, the molten slag droplets are solidified and removed along with other particulate solid matter before they encounter the surfaces of conventional energy utilizing means such as expansion and gas turbines, and heat exchangers i.e. convectional-type gas coolers. For example, the gas cooler described in U.S. Pat. No. 3,690,774 with helical or spiral coiled tubes may be used to further cool the partially cooled and cleaned synthesis gas, as produced by our process. Boilers of this general design have a high heat exchange surface. However, the coils have sharp bends which make the tubes vulnerable to plugging. The coils are difficult to remove and replace, and they are expensive to clean and maintain. Further, for metallurgical reasons, the maximum inlet gas temperature should be held to a safe operating temperature in the range of about 900° F. to 1800° F. These difficulties are overcome by the subject invention which reduces the temperature of the hot raw gas stream coming from the reaction zone of the gas generator and also removes entrained solids and slag. The thermal efficiency of the partial oxidation gasification process is thereby increased by recovering energy from the hot raw gas stream. Further, more by-product steam for use in the process or for exporting may be produced by indirect heat exchange of the hot gas stream with water, first in the radiant cooler, and second in the convection type gas cooler. By means of the subject invention, the recovery of thermal energy from the hot gases is simplified.

A typical partial oxidation synthesis gas generator is shown in co-assigned U.S. Pat. No. 2,818,326. A burner is located in the top of the gas generator along the central vertical axis for introducing the feed streams. A suitable annulus-type burner is shown in co-assigned U.S. Pat. No. 2,928,460. The gas generator is a vertical cylindrical steel pressure vessel lined on the inside with a thermal refractory material.

The solid carbonaceous fuels are preferably ground to a particle size so that 100% of the material passes through an ASTM E 11-70 Sieve Designation Standard 425 $\mu$m (Alternative No. 40) and at least 40% passes through an ASTM E 11-70 Sieve Designation Standard 75 $\mu$m (Alternative No. 200). 1000 $\mu$m=1 mm. The ground solid carbonaceous fuel is then introduced into a storage hopper at room temperature and atmospheric pressure.

The normal moisture content of the solid carbonaceous fuels as received at the point of use can vary in the range of about 0 to 40 weight percent. For example, the moisture content as received for anthracite and bituminous coals may be in the range of about 2 to 10 wt. % of dry weight, up to 30 wt. % of dry weight for sub-bituminous coals, and up to 40 wt. % of dry weight, or more for lignite. Generally, the solid carbonaceous fuel may be used without reducing the moisture content as received. However, predrying may be required in some instances to reach a more desirable moisture content, say below 20 wt. % or even below 2.0 wt. %.

The ground solid carbonaceous fuel in the form of a slurry with water or liquid hydrocarbon, or entrained in a gaseous medium as previously described, is passed into the reaction zone of the partial oxidation gas generator by way of one of the passages in the annulus-type burner. This feedstream may be at room temperature or it may be preheated to a temperature up to as high as about 600°, but preferably below the cracking temperature. Advantageously, the carbonaceous feed may be preheated by direct or indirect heat exchange with by-product superheated or saturated steam, or advantageously by other suitable means to be described later.

A supplemental temperature moderator to moderate the temperature in the reaction zone may not be required with water slurries and when the solid fuel is dispersed in some gaseous hydrocarbon fuels. Suitable temperature moderators include superheated steam, saturated steam, unsaturated steam, water, $CO_2$-rich gas, a portion of the cooled exhaust from a turbine employed downwstream in the process, nitrogen in air, by-product nitrogen from a conventional air separation unit, and mixtures of the aforesaid temperature moderators. The temperature moderator may be introduced in admixture with either or both reactant streams. Alternatively, the temperature moderator may be introduced into the reaction zone of the gas generator by way of a separate conduit in the fuel burner.

The term free-oxygen containing gas, as used herein is intended to include air, oxygen-enriched air, i.e. greater than 21 mole % oxygen, and substantially pure oxygen, i.e. greater than 95 mole % oxygen, (the remainder comprising $N_2$ and rare gases). Free-oxygen containing gas may be introduced into the burner at a temperature in the range of about ambient to 1,800° F.

The relative proportions of solid carbonaceous fuel, temperature moderator, and free-oxygen in the reaction zone of the gas generator are such as to ensure an autogenous temperature in the gas generation zone within the range of about 1800° to 3000° F., such as about 2000° to 2800° F., and to produce a particulate phase containing ash and about 0.1 to 20 wt. % of the organic carbon in the feed, and typically about 1 to 4 wt. %. The particulate phase is entrained in the effluent gas stream leaving the reaction zone along with any non-combustible slag.

Other operating conditions in the gas generator include; pressure in the range of about 10 to 190 atmospheres and preferably about 30 to 100 atmospheres; the ratio of the atoms and free-oxygen containing gas plus the atoms of organically combined oxygen in the solid carbonaceous fuel per atoms of carbon in the solid carbonaceous fuel (O/C atomic ratio) may be in the overall range of about 0.7 to 1.6. More specifically, with substantially pure oxygen feed to the reaction zone the broad range of said O/C atomic ratio may be about 0.7 to 1.5 and preferably with air feed to the reaction zone the broad range may be about 0.8 to 1.6 and preferably about 0.9 to 1.4. With $H_2O$ as the temperature moderator, the weight ratio of $H_2O$ to carbon in the solid carbonaceous fuel feed is in the range of about 0.5 to 2.0 and preferably in the range of about 0.7 to 1.0. With substantially pure oxygen feed to the gas generator, the composition of the effluent gas from the gas generator in mole % dry basis may be as follows: $H_2$ 5 to 40, CO 40 to 60, $CO_2$ 5 to 25, $CH_4$ 0.01 to 3, and $H_2S+COS$ 0 to 5, $N_2$ nil to 5, and A nil to 1.5. With air feed to the gas generator, the composition of the generator effluent gas in mole % dry basis may be as follows: $H_2$ 2 to 20, CO 15 to 35, $CO_2$ 5 to 25, $CH_4$ 0 to 2, $H_2S+COS$ 0 to 3, $N_2$ 45 to 70, and A 0.1 to 1.5.

The hot raw gas stream produced in the reaction zone, leaves the reaction zone by way of a centrally located outlet in the bottom of the reaction zone which is coaxial with the central longitudinal axis of the gas generator. The hot gas stream passes through said bottom outlet and expands directly into a gas diversion and residue separation chamber which is preferably located directly below the reaction zone. The gas diversion and residue separation zone is refractory lined and is preferably coaxial with the central vertical axis of the reaction zone of the gas generator. Preferably, both zones are within the same upright closed pressure vessel. Alternately, the diversion chamber may be in a separate vessel attached to the bottom outlet of the gas generator. The residence time in the reaction zone of the gas generator is in the range of about 1 to 10 seconds, say about 3 to 5 seconds. The net internal volume of the first gas diversion and residue separation chamber is only about 5 to 50% of the net internal volume of the reaction zone.

The hot raw gas stream passes through the bottom outlet in the reaction zone at a velocity in the range of about 20 to 50 ft. per sec., say about 30 to 40 ft. per sec. The velocity of the hot gas stream is reduced in the gas diversion chamber and particulate matter and molten slag moves by gravity through an outlet located at the bottom of the diversion chamber and preferably, into a pool of water contained in a slag chamber located below. In one embodiment, a dip tube is attached to the underside of said bottom outlet. Preferably, the inlet and bottom outlets of the diversion chamber are centrally located and coaxial with the central vertical axis of the diversion chamber. Preferably, the slag chamber is located directly below the bottom outlet of the diversion chamber, and in the same pressure vessel as the reaction zone and the diversion chamber. Preferably, the central vertical axis of the slag chamber is coaxial with that of the gas diversion chamber. Alternately, the slag chamber may be in a separate vessel which is attached to the bottom of the vessel containing the diversion chamber. In one embodiment, the slag chamber is lined with refractory and operated dry.

The shape of the gas diversion chamber may be cylindrical, spherical, or it may be outwardly diverging or expanding conically from the entrance to an enlarged central portion followed by an inwardly converging or converging conically shaped portions to separate outlets in the side and bottom. An outlet located in the side wall of the slag chamber below the bottom exit in the diversion chamber but above the water level, and a cooled control valve, may be used optionally for withdrawing a comparatively small bleed stream of raw hot gas from the slag chamber. The bleed gas stream enters the slag chamber by way of the bottom outlet in the gas diversion chamber carrying with it entrained particulate matter and molten slag. The later material drops to the bottom of the slag chamber. When necessary, this bleed stream will keep the bottom outlet in the diversion chamber hot, thereby preventing bridging and plugging with solid matter and slag. From about 0 to 20 vol. %, say about 0.5 to 10 vol. % typically 5 vol. % of the hot raw gas stream entering the first gas diversion chamber may be employed as bleed gas. In a preferred embodiment, the bleed gas and/or slag passes into the quench water contained in the bottom of the first slag chamber by way of a vertical dip tube attached to the underside of the bottom central exit orifice in the first gas diversion and residue separation chamber. The bleed gas leaving the slag quench chamber by way of said side outlet and control valve is preferably passed through a separate heat exchanger. For example, the hot bleed gas may be used to preheat a coal-water slurry feedstream to the gas generator. The bleed gas may be then mixed with the main gas stream leaving a conventional convection-type gas cooler. Alternately, the stream of bleed gas may be used as the transport medium for powdered solid carbonaceous fuel and introduced into the gas generator with the feed.

From about 80.0 to 100 vol % of the hot raw gas stream entering the first gas diversion chamber leaves by way of a thermally insulated side transfer line and passes directly into the inlet of a second gas diversion and residue separation zone, which is located nearby in a separate vertical cylindrical pressure vessel. The second pressure vessel is parallel to the first pressure vessel and closely connected thereto by said transfer line. In a preferred embodiment, the gas diversion and residue separation zone in the second vessel is sized larger but is similar in shape and design to the gas diversion and residue separation chamber previously described in the first vessel. The central vertical axis of said gas diversion and residue separation zone is preferably coaxial with the central vertical axis of the second vessel. The net internal volume for the gas diversion chamber in the second vessel is about 4 to 10 times greater than the net internal volume for the gas diversion chamber in the first vessel. Additional particulate solids and slag drop out of the gas stream by gravity in the second gas diversion vessel and fall through a central opening in the bottom of the gas diversion chamber into a pool of water contained in the slag chamber located in the bottom of the second vessel. Preferably, the central vertical axis of the gas diversion and residue separation chamber in the second vessel is coaxial with the central vertical axis of the slag chamber. A bleed stream comprising about 0 to 20 vol. %, say about 0.5 to 10 vol. % of the gas stream passing through the refractory lined transfer tube and entering the second gas diversion zone, is optionally passed through the bottom opening in the diversion chamber and then through an outlet in the wall of the slag chamber located above the pool of water contained in the bottom. The function and disposition of this second bleed stream is similar to that of the first bleed stream described previously in connection with the slag chamber in the first vessel. In one embodiment, the bleed gas and/or slag passes into the quench water contained in the bottom of the second slag chamber by way of a vertical dip tube attached to the underside of the bottom central first orifice in the second gas diversion and residue separation chamber. In another embodiment, the slag chamber in the second vessel is lined with refractory and operated dry.

The longitudinal axis of the transfer line connecting the first and second gas diversion and residue separation chambers is preferably in the same plane with the central vertical axis of the two vessels. Further, the longitudinal axis of the transfer line makes an angle with and measured clockwise starting in the third quadrant from the central vertical axis of the second gas diversion and residue separation zone in the range of about 30° to 120°. Suitably, this angle may be in the range of about 40° to 110°, say about 60°, and preferably upward or downward. The actual angle is a function of such factors as temperature and velocity of the gas stream, and the composition, concentration and characteristics of the entrained matter to be removed. For example, when the raw gas stream contains liquid slag of high fluidity, the longitudinal axis of the raw inlet nozzle may be pointed upward at an angle of about 60° measured clockwise from the central vertical axis of the second vessel starting in the third quadrant. Much of the slag would run down the transfer line into the first gas diversion chamber and from there into the pool of water located at the bottom of the first vessel. On the other hand, when the liquid slag is viscous, the flow of the slag may be helped along by pointing the transfer line downward say at an angle of about 120° measured clockwise from the third quadrant. The high velocity of the hot raw gas stream passing through the transfer line and the force of gravity would then help to move the viscous liquid slag into the second gas diversion chamber, where the slag may be separated from the gas stream by gravity. The velocity of the hot raw gas stream through the transfer line is in the range of about 20 to 100 ft. per sec., say about 30 to 60 ft. per sec., and typically about 40 ft. per sec. The reduced velocity of the hot raw gas stream passing upwardly through the second gas diversion chamber located in the second upright closed pressure vessel permits the entrained solid materials to fall by gravity down through the central opening in the bottom of the second gas diversion chamber into the pool of water contained in the bottom of the second vessel. Optionally, in place of a thermal refractory lining, the inside walls of one or both of the slag catch pots at the bottom of the first and second vessels may be water jacketed or lined with water cooled tube-walls. The velocity of the hot raw gas stream through the transfer line is in the range of about 1.5 to 3 times the velocity of the hot raw gas stream passing through the bottom outlet of the reaction zone.

The main hot raw gas stream passing upwardly through the second gas diversion chamber leaves by way of a central outlet in the top at a temperature in the range of about 1800° F. to 3000° F. Very little, if any, of the sensible heat in the hot raw gas stream is lost during its passage through the first and second gas diversion and residue separating zones. The hot raw gas stream then directly enters into the bottom of a radiant cooling section located in the upper portion of the second pressure vessel and freely passes upwardly through the central unobstructed vertical passage on the inside of a water-cooled tube-wall. Preferably, the central vertical axis of the radiant cooling section is coaxial with the central vertical axis of the second pressure vessel. The net internal volume of the radiant cooling section is about 5 to 10 times the net internal volume of the reaction zone of the gas generator. Upright tubes, through which a coolant passes, line the inside walls of the radiant cooling section. The walls of the pressure vessel are thereby protected from thermal and corrosive damage. The dwell time of the gases passing up through the radiant cooling section is in the range of about 15 to 50 seconds, say 20 to 40 seconds. The vertical radiant cooling section being located immediately upstream of an energy utilizing means provides an additional chamber for the gravity settling and separation of solid particles and slag from the hot gas stream, thereby protecting the energy utilizing means from being fouled. One further function of the radiant cooling section is to cool the upflowing hot gas stream to below the maximum safe operating temperature for the energy utilizing means that follows i.e. to a temperature of about 900° F. to 1800° F. Also, during this gas cooling period at least the outer shell of any remaining ash particles in the gas stream is solidified. This prevents the particles from sticking to the tubes in the radiant and convection sections of the gas coolers.

For example, the hot gas stream first gives up a part of its heat to the boiler tubes located in the radiant cooling section. Then the gas with a reduced temperature passes into a convection zone likewise equipped with boiler tubes where it is further cooled to a temperature in the range of about 650° to 150° F. The walls of the vertical steel pressure vessel containing the radiant cooling section are protected against the action of the upwardly flowing hot gases by the cooling surfaces of the tube-wall placed in from of the vessel wall. In a preferred embodiment, a plurality of thin-walled vertical tubes with or without side fins line the inside walls of the radiant cooling section of the second vessel. The adjacent rows of tubes are longitudinally welded together to make an annular gas-tight wall of tubes. The lower and upper ends of each of said tubes may be respectively connected to lower and upper annular shaped headers. When the coolant in the radiant cooler is water or a mixture of water and steam, the highest temperature that the pressure shell can reach is the temperature of the saturated steam within the radiant cooler. Boiler feed water is introduced into the bottom header and then passes up through the plurality of separate upright tubes into the top header. The mixture of steam and water is removed from the top header and introduced into an external steam drum where separation takes place. The saturated steam removed from the steam drum may be used elsewhere in the process to provide heat or power. Optionally, at least a portion of the saturated steam may be superheated. The hot water separated in the steam drum may be returned to the bottom header of the radiant cooler.

Water containing solids and slag in the slag chambers located at the bottom of vessels 1 and 2 is removed by way of a conventional lockhopper and sent to a solids removal zone. The reclaimed quench water may be then recycled back to the slag chambers at the bottom of vessels 1 and 2. In a preferred embodiment, the quench water containing solids leaving the slag chambers in vessels 1 and 2 at a temperature in the range of about 400° to 550° F. is passed in indirect heat exchange with boiler feed water. By this means, the temperature of the boiler feed water is increased about 10° to 100° F. The preheated boiler feed water is then introduced into the bottom header of the radiant cooler.

As previously mentioned, in one embodiment of the subject invention the slag chamber in vessel 1, vessel 2, or both vessels is equipped with a dip tube. In such case, the solid material and slag and optionally bleed gas may be passed through the bottom outlet in one or both of the separate gas diversion and residue separation chambers located in each pressure vessel, and then passed through respective dip tubes that terminate below the level of the water contained in the respective slag chambers. By this means, the bleed gas may be cleaned and partially cooled. The dip tube will be described in greater detail in connection with the discussion of FIG. 1.

In another embodiment of the subject invention, the gas diversion and residue separation chamber in the second pressure vessel contains at least one high temperature resistant gas-solids impingement separator. Alternately, the gas diversion and residue separation zone may be a gas-solids separation means comprising at least one high temperature resistant gas-solids impingement separator. For example, from about 2 to 8 thermally insulated gas-solids impingement separators may be connected in parallel and/or series. In these embodiments, both wet and dry type slag pots may be employed to receive the solid matter and slag separated from above. The hot gas stream passes through the gas-solids impingement separation means at substantially the same temperature as produced in the reaction zone, i.e. about 1800° to 3000° F. less ordinary temperature losses in the lines i.e. about 50° to 200° F. The gas-solids impingement separation means are made from high temperature refractory materials that have the necessary mechanical strength over this temperature range. Further, the refractory provides thermal insulation to prevent heat loss from the hot gas stream passing through. Suitable refractory materials include: high purity high density aluminum oxide, chronium aluminum oxide, and silicon carbide. Both wet and dry type slag pots may be employed to receive the solid matter and slag separated from above. Optionally, one or more dip-tubes may be employed The gas-solids impingement separation means is essentially a network of baffles. The raw gas stream passes freely through the maze of paths with very little pressure drop i.e. 0.1–1.5 in. of water. Further, there is substantially no reduction in temperature. Upon striking or impinging a baffle in its path, the direction of the gas stream is changed and particulate matter and slag separate out. The separated material falls down through the bottom outlet or outlets of the gas-solids impingement separating means and into the slag chamber below. The slag chamber may be dry or contain a pool of quench water in the bottom. The baffles may comprise flat or curved plates or screens. The plates may be solid or contain small openings or holes. The direction of the gas stream changes many times as it proceeds through the labyrinth; and the cleaned gas stream leaves the maze from the opposite end from which it enters and then passes upward.

One conventional reverse nozzle gas-solids impingement separator comprises a rigid structure made up of a plurality of longitudinal somewhat trapezoidal vertical cells in a plurality of horizontal rows. For example, there may be from about 2–20, say about 2–5 cells in a row; and there may be about 2–20 rows of cells in the structure. The walls of the cells are constructed from thin i.e. 0.01 to 0.250 thick high temperature resistant refractory material. Each cell is separated from the adjacent cell on each side by a vertical wedge shaped converging nozzle through which the gas stream passes in a forward direction. The sides of each nozzle may also constitute the flat sides of each cell. Each cell has a rear concave upstream wall and a front convex downstream wall. A vertical solid partition or wall is located between said front and rear cell walls and extends normal to the direction of gas flow. This intermediate wall divides each cell longitudinally into two separate upstream and downstream compartments. The front and back curved walls of each cell may contain a plurality of small evenly spaced openings or small diameter holes i.e. 0.03–0.500 inches over the entire area. The rows of cells are staggered so that the gas streams leaving the narrow ends of the converging wedge-shaped vertical nozzles in one row impinge directly onto the rear concave upstream wall of the cell located in the next row downstream. The individual cells are closed at the top and open on the bottom through which the solid matter passes.

In operation, the hot raw gas stream enters the gas-solids impingement separator from the upstream end and then may split and pass through at least one i.e. about 1-19, say 1-3, parallel converging longitudinal wedge-shaped vertical nozzles located between the cells in the first row. If the upstream panels of each cell contain small holes then a portion of the gas stream will flow in and out of the upstream compartment of the cell before entering a vertical wedge-shaped nozzle. The hot gas stream leaving the downstream end of each wedge-shaped nozzle strikes a concave upstream wall of the cell in the second row. A portion of the entrained solids and slag separate out on the surface of the cell wall and then falls to the bottom of the impingement separator. The gas stream leaving the first row of nozzles splits and separate portions flow in opposite directions into the upstream entrance to the wedge-shaped vertical nozzles located between the cells in the second row. In doing so, the separate portions of the hot raw gas stream reverse their directions and flow upstream striking the downstream face of the convex wall of the downstream compartments of the adjacent cells in the first row. There the impinging gas streams again reverse their direction. A portion of the gas stream passes through the downstream cell wall and the remainder may proceed forward through the wedge-shaped nozzles located in said second row. Entrained solid matter and slag may separate out within the front and rear compartment of each cell as well as on the faces of the front and rear cell walls of each cell. The gas stream leaving through the downstream ends of the vertical wedge-shaped nozzles in the last row of cells passes upwardly directly into the radiation cooling section or alternately into the inlet to another gas-solids impingement separator connected in series. In one embodiment, a plurality of thermally insulated gas-solids impingement separators may be thereby connected in series i.e. about 2-6, such as 2-4, say 2 to produce a multiple stage gas-solids impingement separator. In such case, the raw gas stream leaving the first gas diversion and residue separating chamber in the first vessel and containing a residual amount of particulate solids and slag, passes through the transfer line and enters directly into the first gas-solids impingement separator in the line. The partially cleaned gas stream leaves each gas-solids impingement separator in the line by way of an outlet and passes directly into the inlet to the next gas-solids impingement separator. The cleaned gas stream leaves the last gas-solids impingement separator in the series by way of the outlet and then passes upward directly into the bottom of a vertical free-flow radiant cooling section of vessel 2. The solid particles, by virtue of their weight will tend to move into a bottom central discharge outlet. In one embodiment, small size particles form clusters that drop into a pool of water contained in the slag chamber at the bottom of the second pressure vessel. Optionally, about 0 to 20 vol. %, such as about 0.5 to 10 vol. %, say 5 vol. % of the hot gas stream passing through the thermally insulated transfer line and entering the second pressure vessel may be passed through the dust trap and bottom outlet along with the solid matter and slag in at least one of the gas-solids impingement separator in the series. This will keep the passages leading into the dust trap and the bottom outlet hot and prevent bridging. The bleed stream leaves the vessel by way of an insulated side outlet located above the pool of water at the bottom of the slag chamber.

The hot stream of bleed gas then passes through an insulated line and cooled control valve.

In another embodiment, a plurality of multiple-stage gas-solids impingement separating units are employed in parallel. Thus, say about 2-6 of the previously described serially connected multi-stage gas-solids impingement separator units are supported in the second pressure vessel. The inlets to the first gas-solids impingement separator of each multi-stage gas-solids impingement separating unit is supplied with hot gas by way of an internal or external manifold which is connected to the thermally insulated transfer line leading to the first gas diversion and residue separation chamber. The cleaned hot gas stream leaving each of the last gas-solids impingement separation means in the series is passed directly up through the radiation zone. As previously described, said second pressure vessel comprises a radiant cooling section in the upper portion and a slag chamber in the lower portion. Optionally, bleed gas and/or separated matter may be discharged into quench water contained in said slag chamber, by way of a vertical dip-tube, connected to the underside of and in communication with the bottom exit orifice of at least one of said gas-solids impingement separators. Alternately, a plurality of first pressure vessels i.e. 2-4, each including a gasifier, first gas diversion and residue separation chamber and first slag chamber, may be employed to produce, say 2 to 4 separate hot partially cleaned feed gas streams. These hot gas streams, separately or in combination may be introduced directly into said manifold connected to the inlet to the first gas-solids impingement separator in each of the plurality of multi-stage gas-solids impingement separator units connected in the second vessel.

In one further embodiment the hot process gas stream leaving the reaction zone of at least one, say 2-6, partial oxidation gasifiers passes directly through separate thermally insulated transfer lines and into the inlet of a single or a plurality such as 2-8, say 4 high temperature resistant thermally insulated gas-solids impingement separators connected in parallel and supported in said second pressure vessel in the manner previously described. Alternately, the hot process gas streams leaving the reaction zones from a plurality of partial oxidation gasifiers, such as 2-6, say 2, passes directly through separate thermally insulated transfer lines and into the inlets to the first gas-solids impingement separator in series for each of a plurality, say 2-6, of said multi-stage gas-solids impingement separator units supported in said second pressure vessel in the manner previously described. Optionally, said thermally insulated transfer lines may discharge into a distribution manifold which in turn feeds said hot gas stream into the inlets to the first gas-solids impingement separator in series for each multi-stage gas-solids impingement separator unit. The distribution manifold may be located inside or outside of the second pressure vessel. For example, it may be a ring-shaped high temperature resistant ceramic pipe. Thus, in the last two examples, the first residue separation chamber and first slag chamber may not be required with some fuel feeds when the entrained solids and slag in the effluent gas stream leaving the reaction zone is low.

For a further discussion of gas-solids impingement separators reference is made to Chemical Engineers Handbook, Perry and Chilton, Fifth Edition 1973 McGraw-Hill Book Co., pages 20-80 to 20-82 which is incorporated herewith by reference.

Thus, advantageously, by the subject process the temperature of the hot raw gas stream leaving the partial oxidation gas generator may be reduced to below the safe maximum operating temperature of a downstream convection-type gas cooler. Further, about 75 to 95 wt. % of entrained solid matter and slag are removed from the hot gas stream. Fouling of heat exchange surfaces, catalyst beds, and other equipment which may be contacted by the hot gas stream is thereby prevented. No liquid scrubbing liquid is employed. Accordingly, the sensible heat in the hot gas stream is not wasted by vaporizing scrubbing fluid, which may then contaminate the gas stream. Solid matter and slag are removed in the first and/or second gas diversion and residue separation chambers or in at least one gas-solids separation means without substantially reducing the temperature of the gas stream. The sensible heat in the raw gas stream is available at the temperature of the reaction zone (less ordinary line losses of about 50°–200° F.) for producing by-product saturated or superheated steam. This steam may be used elsewhere in the process or exported. For example, steam may be used for heating purposes, for producing power in a steam turbine, or recycled to the gas generator as a temperature moderator. Alternately, at least a portion of the cleaned and cooled gas stream leaving the radiant cooling section may be passed through an expansion turbine for the production of mechanical energy, electrical energy, or both. The gas stream leaving the downstream convection-type gas cooler at a temperature in the range of about 150° to 600° F., or exiting from some other energy utilizing means, optionally may be subjected to additional process steps including gas scrubbing, purification, or both, depending on its intended use as a synthesis gas, reducing gas, or fuel gas.

DESCRIPTION OF THE DRAWING

A more complete understanding of the invention may be had by reference to the accompanying drawing which illustrates in FIGS. 1 to 4, different embodiments of the invention.

In FIG. 1, closed cylindrical vertical steel pressure vessel 1 comprises three main sections: reaction zone 2 lined with refractory 3 in the upper portion, gas diversion and residue separation chamber 4 which is located below reaction zone 2 and connected by passage 5, and first slag chamber 6 which contains a pool of water 31 at the bottom of pressure vessel 1. Optionally, the slag chamber 6 may be dry. Alternately, the previously described three sections may comprise three separate flanged pressure vessels which are vertically stacked, connected, communicating, and arranged in a manner similar to that shown in FIG. 1.

Top inlet 7 is located in the top and bottom outlet 8 is located in the bottom of vessel 1. The axes of outlets 7 and 8 lie along the central vertical axis of vessel 1. Annulus-type burner 9, comprising center passage 10, inlet 11, and annulus passage 12 is mounted in upper inlet 7. A mixture of ground coal in a transport medium (such as a coal-water slurry) in line 13 is pumped by means of pump 14 through line 15 into heat exchanger 16 where the slurry is preheated by indirect heat exchange with at least a portion of the bleed gas from lines 17, 18, or both. Alternately, another hot stream i.e. steam may be used to preheat the slurry. The preheated coal-water slurry in line 19 is passed through inlet 11 and annulus passage 12 of burner 9 into reaction zone 2 where it impinges and reacts by partial oxidation with a stream of free-oxygen containing gas. For example, a stream of substantially pure oxygen or air in line 20 is preheated in heat exchanger 21 with steam from line 22. The preheated free-oxygen containing gas is then passed through line 23 and center passage 10 of burner 9 into the reaction zone where the partial oxidation reaction takes place with the coal-water slurry. The cooled bleed stream leaving the heat exchanger 16 by way of line 24 is mixed downstream in the process with the cooled main gas stream leaving a convection type of gas cooler (not shown). Alternately, the heating fluid in heat exchanger 16 may be a portion of the saturated steam produced downstream in the process in line 25.

The hot raw gas stream containing residue from the partial oxidation reaction i.e. entrained particulate solids and molten slag leaves reaction zone 2, passes downwardly through connecting passage 5 at high velocity, and enters gas diversion chamber 4 where the velocity of the gas stream is suddenly reduced. About 45 to 50 wt. % of the entrained solids and slag drop out of the gas stream by gravity in diversion chamber 4 and pass through outlet 30 in the bottom of diversion chamber 4. The central vertical longitudinal axis of passage 5 and bottom outlet 30 of chamber 4 lie along the central longitudinal vertical axis of vessel 1. The solid material and slag drop into water 31 contained in slag chamber 6 at the bottom of vessel 1.

Dip-tube assembly 26 may be optionally employed. When used, it is connected to and in communication with bottom outlet 30. By this means bleed gas and/or solid matter and slag may be discharged directly into quench water 31 and partially cooled. Annular shaped water distribution collar 27 is attached to the bottom of support 28. Support 28 for refractory 51 extends from the vessel wall. Vertical dip-tube 60 extends from the bottom of collar 27 to below the water level. Quench water in line 41 is introduced through pipe 42 and passes into distribution collar 27. The water then passes out through an annular slot in the bottom of collar 27 and contacts the inside surfaces of dip-tube 60. The water helps to cool the material passing through dip-tube 60 and prevents the tube from overheating. Vertical draft tube 61 is concentric with dip-tube 60 and is radially spaced therefrom by means of spacer bars 62. Spacer bars or supporting legs 63 may be used to support the dip-tube assembly. They extend from the vessel bottom or wall to the lower part of draft tube 61.

In order to keep outlet 30 clear and free from solid material, a portion i.e. about 1 vol. % of the gas stream may be diverted as a stream of bleed gas through bottom outlet 30, dip-tube 26 if used, and refractory lined outlet 32 in the side wall of vessel 1 above the level of water 31 in the bottom. The bleed gas is passed through insulated line 33, water cooled control valve 34, insulated line 17 and optionally into heat exchanger 16. A mixture of hot water and solids is removed from the bottom of vessel 1 through bottom outlet 8, lines 35, 36, heat exchanger 37, line 38, valve 39, and line 40 to a lock hopper system (not shown). Solids are removed from the quench water in a solids recovery zone (not shown), and the quench water is returned to slag chamber 6 by way of line 41 and side inlet 42.

When bridging of bottom outlet 30 is not a problem, then all of the hot raw gas stream entering gas diversion chamber 4 exits by way of side outlet 43. From there the hot gas stream passes through transfer line 44 at high velocity. Transfer line 44, is a passageway lined with refractory 45. The gas stream enters the gas-solids impingement separator 91 in second gas diversion and residue separation chamber 46 located in second pressure vessel 50 by way of inlet 47. By inclining transfer line 44, for example, about 60° measured clockwise from the vertical central axis of vessel 50 starting from the third quadrant, as shown in the drawing, molten slag that separates from the gas stream may easily run down the transfer line and flow back into gas diversion chamber 4. From there the slag drops into the pool of water at the bottom of slag chamber 6. The design of the second gas diversion and residue separation chamber 46 in pressure vessel 50 is similar to that previously described for the first gas diversion and residue separation chamber 4 in the first pressure vessel. However, the size of gas diversion chamber 46 is larger than that of gas diversion chamber 4. This will provide the gas stream passing through gas-solids impingement separator 91 and through gas diversion chamber 46 with a longer dwell time for separation of particulate matter and slag. About 25 to 30 wt. % of the total amount of particulate matter and slag is removed from the gas stream in the second gas diversion chamber 46. Gas diversion and solid separation chamber 46 is equipped with upper outlet 48 and bottom outlet 49. The central vertical longitudinal axis of outlets 48 and 49 lie along the central vertical longitudinal axis of closed vertical cylindrical pressure vessel 50. Gas diversion chambers 4 and 46 are either made from a thermal refractory material 51 and 51a respectively, or they are lined with a thermal refractory material. By this means, there is substantially no drop in temperature or pressure as the gas stream passes through free-flow diversion chambers 4 and 46. Solid material and slag which separate by gravity from the gas stream in gas-solids impingement separator 91 and/or from radiant cooling section 65 by way of annular passage 64 between the outside perimeter of impingement separator 91 and the inside surface of refractory 51a, drop through bottom outlet 49 into a pool of water 52 located in the second slag chamber 53 at the bottom of vessel 50. When necessary, for example with high slagging feedstocks, a very small portion of the hot raw gas stream passing through diversion chamber 46 is continuously passed through bottom outlet 49, refractory lined outlet 54 located at the bottom of vessel 50 and above the level of water pool 52, insulated line 55, water cooled valve 56 and insulated line 18.

A diptube (not shown), but substantially as described previously in connection with the first gas diversion and residue separation chamber i.e. dip-tube 26, may be optionally connected to refractory support 74 located at the underside of bottom outlet 49. The dip-tube, if present, is in communication with bottom outlet 49. Bleed gas and/or material separated in the second gas diversion and residue separation chamber may be passed through bottom outlet 49 and the dip-tube which discharges beneath quench water 52 in second slag chamber 53.

Optionally, the bleed gas in line 18 may be mixed with the bleed gas in line 17 and used to preheat the coalwater slurry in heat exchanger 16. Alternatively, the bleed gas in line 18 may be mixed downstream with most of the gas stream leaving a convection type gas cooler (not shown). The hot water containing solids in water pool 52 leaves by way of central outlet 57 at the bottom of vessel 50, and line 58. Advantageously, the sensible heat in this stream of water is recovered by mixing it with the water containing solids in line 35 from vessel 1 and passing the mixture through line 36 into heat exchanger 37.

FIG. 2 is a horizontal cross sectional view of the apparatus of FIG. 1 taken along line 2—2 of FIG. 1. A vertical cross sectional view of gas impingement separator 91 taken along line 1—1 of FIG. 2 is shown in FIG. 1. The gas-solids impingement separator 91, as shown in FIGS. 1 and 2 is a rigid vertical box-like structure that encloses and supports on the inside a plurality of rigid vertical cells and rigid vertical wedge shaped nozzles that extend downward from and are attached to the underside of roof 118 of the structure. In addition, the front and rear walls of half-cells are attached to side walls 99. Further, the flat sides of each converging vertical nozzle may constitute the side walls of each adjacent cell. The shell comprises four rectangular substantially solid rigid side panels 99 and one rigid solid top panel 118. The structure is partially open at the bottom for discharge of solid matter and slag. Included in impingement separator 91 are at least one full vertical cell 92, right and left vertical half cells 93 and 94, upstream vertical half cells 95 and 96, upstream vertical inlet chamber 97, downstream vertical outlet chamber 98, vertical wedge shaped nozzles 100–104, upstream vertical concave walls 105–109, intermediate vertical flat walls 110–112, downstream vertical convex walls 113–115, and downstream vertical flat walls 116 and 117.

Gas-solids impingement separator 91 is supported within the second refractory lined gas diversion and residue separator chamber 46 by brackets 160 which extend from the side wall of shell 50. Refractory 51a is supported from underneath by side brackets 74 which are attached to the inside wall of pressure vessel 50.

In operation, the hot gas stream in thermally insulated transfer line 44 passes through inlet 47 into upstream inlet chamber 97 where it impinges against upstream concave wall 105 containing a plurality of openings or holes 131. The gas stream splits. A portion of the gas stream passes through openings 131 in wall 105 and enters the front upstream compartment 132 of cell 92. The gas emerging from holes 131 and the split stream then pass through wedge shaped nozzles 100 and 101. The emerging gas streams strike upstream concave walls 108 and 109. Portions of the gas streams pass through openings 131 in upstream walls 108 and 109 and enter upstream compartments 133 and 134. Portions of the gas streams emerging from nozzles 100 and 101 change direction, mix with the gas emerging from compartments 133 and 134 and impinge against downstream convex walls 113–115. Portions of said gas mixture pass through openings 131 in said walls and enter downstream compartments 135–137. The gas stream then passes through nozzles 102–104, downstream outlet chamber 98, upper rectangular outlet 138, and through passage 48 into radiant cooling section 65.

The entrained solids and slag which drop out of the hot gas stream when the gas stream impinges against the front and rear cell walls and in the comparatively quiescent cell compartments falls through bottom openings 139 in the bottom of the impingement separator, and passage 49 into the bottom of slag chamber 53.

The hot raw gas stream passing upwardly through gas diversion solid separation chamber 46 in FIG. 1 leaves by way of upper central outlet 48 and enters directly into the bottom of radiant cooling section 65. This section comprises a radiant boiler and is located in the upper portion of vessel 50. Tube wall 66, through which a coolant flows, is part of the radiant boiler and lines the inside walls of the upper section of vessel 50. The gas-tight tube wall protects the inside surfaces of the steel pressure vessel from corrosive and thermal damage from the hot gas stream that contacts the outside surfaces of the tubes while passing outwardly through the radiant cooling section. Tube wall 66 is in communication with annular header 67 at the bottom and annular header 68 at the top. By this means the coolant enters bottom header 67 by way of line 69 and inlet 70, passes upwardly through the individual upright tubes in tube wall 66 to upper header 68, and leaves by outlet 71 and 72. Tube wall 66 may comprise a plurality of vertical thinwalled tubes that are longitudinally welded to each other. The velocity of the hot raw gas stream passing up through the radiation section 65 is less than that of the gas stream passing up through diversion chamber 46; which velocity in turn is less than the velocity of the gas stream passing down through gas diversion chamber 4. Similarly, the dwell time of the gas stream in radiant cooling section 65 is greater than that in gas diversion chamber 46; which dwell time in turn is greater than that in gas diversion chamber 4. There are no obstructions along the central longitudinal vertical cylindrical shaped core of radiant boiler 65. Accordingly, the upflowing hot raw gas stream passes freely therethrough; and, about 10 to 15 wt. % of the total solids produced in the gas generator drop out of the gas stream and fall down by gravity through openings 48 and 49 into the pool of quench water 52. Tube-wall 66 encircles said central passage.

Makeup quench water may be introduced into slag chamber 53 by way of line 75 and inlet 76 at the bottom of vessel 50. Slag chambers 6 and 53 may be water jacketed or insulated. Annular shaped water jackets 120 and 121, respectively line the inside walls of slag chambers 6 and 53. Cooling water enters said cooling jackets by way of lines 123 to 125 and inlets 126 and 127. Heated water leaves jacket 120 through upper outlet 128 and line 129. Heated water leaves jacket 121 through upper outlet 130 and line 131a.

In a preferred embodiment, makeup boiler feed water (BFW) in line 77 is preheated in heat exchanger 37 by indirect heat exchange with one or both of the hot water streams containing solid material from slag chambers 6 and 53. The preheated BFW is passed through line 78 and mixed in line 69 with water from line 79. The preheated water in line 69 is passed through inlet 70 into lower header 67. The water rises in tube wall 66 and is heated by indirect heat exchange with the hot gas stream flowing upwardly through the radiant cooling section. A mixture of water at its boiling point and steam leaves upper header 68 through outlet 71, line 72, and enters steam drum 85. The steam and water separate in steam drum 85 and water is removed by way of bottom outlet 86 and 79. The water is recycled to the lower header 67 of radiant boiler 65 as previously described. Saturated steam is removed from steam drum 85 by way of upper outlet 87, line 88, valve 89 and line 25. This saturated steam may be used elsewhere in the process thereby increasing the thermal efficiency of the process. For example, the saturated steam may be superheated and used as the working fluid in a steam turbine for the production of mechanical power, or electrical energy, or both.

The partially cooled and cleaned gas leaves the radiant cooling section 65 by way of outlet 90 at or near the top of vessel 50. Outlet 90 is connected directly to an energy utilizing device (not shown) which operates downstream at elevated pressure. The connection may be at an angle, for example, of 0° to 90° with the vertical axis of vessel 50. By this means, the energy utilizing device may be operated at the same pressure as the gas produced in gas generator 3 less ordinary pressure drop in the lines. Advantageously, by the subject invention the temperature of the gas stream may be reduced in radiant cooling section 65 to below the maximum safe operating temperature of the downstream energy utilizing means. Further, by removing from about 75 to 95 wt. % of the entrained solids and slag from the hot raw gas stream by means of the subject process, the life and performance of said energy utilizing means is increased. For example, the partially cooled and cleaned gas stream for outlet 90 may be introduced directly into a conventional convection type gas cooler thereby superheating and/or generating steam and heating boiler feed water. Thence, the gas, still substantially at generation pressure may be further scrubbed of particulate matter by well known systems. See coassigned U.S. Pat. No. 3,097,081 for further processing of the gas stream to produce a clean chemical synthesis feed stream or for use as a clean fuel gas. Alternately, the partially cooled and cleaned gas stream leaving outlet 90 may be introduced directly as the working fluid into an expansion turbine for the production of mechanical power, electrical energy, or both.

As previously described, closed vertical steel pressure vessel 50 comprises three principal sections which are connected and communicating: (1) radiant cooling section 65, (2) gas diversion and residue separation section 46, and (3) slag cooling and removal section 53. Optionally, these three sections may be contained in one or more separate pressure vessels which are assembled vertically and interconnected in the order shown in the drawing.

FIG. 3 is a cutaway diagrammatic representation of one embodiment of the invention in which the second gas diversion and solids separation means in the second pressure vessel 50 comprises a high temperature resistant thermally insulated gas-solids impingement separator 150 which is similar to the gas-solids impingement separator described previously in connection with FIGS. 1 and 2 but which is provided with additional thermal insulation i.e. refractory 151. While one impingement separator is shown, at least one additional impingement separator like the first may be connected in series to provide a multiple stage gas-solids impingement separator unit. In such case, the partially cleaned gas stream leaving exit 138 of the first impingement separator would enter inlet 47 of the next gas-solids impingement separator in the line. The cleaned hot gas stream with substantially very little temperature loss i.e. 50°–100° F. or drop in pressure passes out of exit 138 of the last impingement separator in the series and then passes directly up through radiant cooling section 65 in the manner described previously in connection with FIG. 1.

There is also depicted in FIG. 3 the optional use of dip-tube 26 for introducing the separated solid matter and slag and optionally bleed-gas into a pool of quench water 52 contained in second slag chamber 53 located in the bottom of second pressure vessel 50. Dip-tube 26 has been described previously in connection with FIG. 1. The water-cooled dip-tube assembly may be attached below and in communication with bottom outlet 156 of dust chamber 155 in at least one of the gas-solids impingement separators 150. The stream of bleed gas i.e. 0 to 20 vol. % of the hot gas stream passing through transfer line 44, may be drawn from the hot gas stream in transfer line 44 and passed through line 152, water-cooled valve 153, insulated line 154, exit dust chamber 155 located at the bottom of impingement separator 150, and dip-tube 26, when used. By this means, passages 139 and 156 may be kept from clogging or bridging with solid matter and/or slag.

In addition, tube wall 66 as described previously in FIG. 1 is extended in the embodiment shown in FIG. 3 over the entire length of second pressure vessel 50 and may replace tube wall 66 in upper radiant cooling section 65 and also water jacket 121 in the second slag chamber 53 of FIG. 1. By this means, the entire shell of second vessel 50 may be protected from overheating. The upper portion of the tube wall may serve as at least a portion of the radiant cooling section. Lower annular header 158 may be immersed in quench water 52, or the second slag chamber may be operated dry. Upper header 68 of tube wall 66, stream drum 85, and the related lines which comprise the upper portion of radiant cooling section 65 (not shown) are the same as described in connection with FIG. 1. Boiler feed water (BFW) from steam drum 85 as shown in FIG. 1, passes through line 79 and is mixed in line 69 with any make-up boiler feed water. The BFW enters the lower header and is heated to produce saturated steam as it passes up the tube wall. The mixture of steam and water leave the upper header of tube wall 66 located in the radiant cooling section as shown in FIG. 1, and from there are introduced into steam drum 85 where separation of the saturated steam and BFW takes place.

Reference numbers for those elements in FIGS. 3 and 4 which are the same as the corresponding reference numbers in FIGS. 1 and 2, have been described previously in connection with FIGS. 1 and 2. Gas-solids impingement separators are supported and spaced from the walls in the second pressure vessel 50 by conventional means such as side brackets 157 in FIG. 3 which extend from the wall of the vessel and contact the lower part of the gas-solids impingement separator 150, and supporting legs 63 which extend upward from the vessel bottom or wall and support the bottom of tube 61. Gas-solids impingement separator 150 is located below the radiant cooling section 65 and above the second slag chamber 53. Thermal insulation i.e. refractory 151 from which gas-solids impingement separator 150 is made prevents the loss of heat from the hot raw gas stream passing through the gas-solids impingement separating means. Annular passage 64 between the outside diameter of the insulated impingement separator and the inside diameter of the tube wall permits any falling solid matter and slag from above to reach second slag chamber 53 below.

FIG. 4 is a schematic drawing showing an embodiment of the subject process in which the second gas diversion and solids separation means comprise a plurality such as 4 as shown, high temperature resistant refractory gas-solids impingement separators 151 and 151a–c connected in parallel to circular thermally insulated refractory manifold 155. FIG. 4 is a horizontal cross sectional view of the apparatus of FIG. 3 taken along line 4—4 of FIG. 3 but showing the connection of three additional gas-solids impingement separators 151a–c and the one shown in FIG. 3 by means of an internal feed gas manifold. In one embodiment, the annular-shaped manifold encircles the outside diameter of the pressure vessel.

In FIG. 4, the hot gas stream from transfer line 44 is introduced into the annular refractory pipe manifold 155; and from there the gas stream is distributed to inlets 47, 47a–c. The construction and operation of gas-solids impingement separators 151 and 151a–c are similar to that described previously in connection with FIGS. 1–3. However, in the embodiment of FIG. 4, four clean separate gas streams leave the four impingement separators and pass upward directly into the radiant cooling section 65. The cluster of gas-solids impingement separators and manifold 155 are spaced and supported by brackets and supports that extend from the walls and bottom of the second pressure vessel, such as bracket 156. For example, free-space 64 between the tube-wall 66, manifold 155, and impingement separators 151 and 151a–c, is provided to permit solid matter and slag that separates out in radiant cooling section 65 to fall by gravity down through the second pressure vessel and into the second slag chamber 53 below.

Other modifications and variations of the invention as hereinbefore set forth may be made without departing from the spirit and scope thereof, and therefore only such limitations should be imposed on the invention as are indicated in the appended claims.

We claim:

1. A process for separating entrained solid matter and slag from a hot raw gas stream comprising $H_2$, CO, $CO_2$, entrained solid matter and slag, and one or more materials from the group $H_2O$, $H_2S$, COS, $CH_4$, $NH_3$, $N_2$, and A as produced in the reaction zone of a gas generator by the partial oxidation of solid carbonaceous fuel at a temperature in the range of about 1800° to 3000° F. and a pressure in the range of 10 to 190 atmospheres, and cooling said hot raw gas stream comprising:

(1) passing said hot raw gas stream directly from said reaction zone downward through a connecting passage at high velocity into a thermally insulated unobstructed free-flow gas diversion and residue separation chamber where the velocity of the gas stream is reduced, said residue separation chamber having a net internal volume which is smaller than that of said reaction zone and having bottom and side outlets, separating by gravity a portion of said solid matter and slag from the gas stream without substantially reducing the temperature of the gas stream, and passing said portion of separated material by gravity through said bottom outlet into a first slag pot located directly below said first gas diversion and residue separation chamber;

(2) passing about 80.0 to 100 vol. % of the hot gas stream from said first gas diversion and residue separation chamber with a portion of said solid matter and slag removed through said side outlet then through a thermally insulated transfer line and then through at least one thermally insulated gas-solids impingement separation means located in a separate vertical pressure vessel from that containing said gas diversion and residue separation chamber, said gas-solids impingement separation means having inlet and outlet means for the hot gas stream and outlet means for the solid matter and slag separated therein, separating additional solid matter and slag from the gas stream by said gas-solids impingement means without substantially reducing the temperature of the gas stream, and passing said separated portion of material into a second slag pot located directly below the gas-solids impingement means;

(3) passing about 80.0 to 100 vol. % of the hot gas stream with a portion of said solid matter and slag removed by said gas-solids impingement separation means directly into the bottom of and upward at a reduced velocity through the unobstructed central vertical passage of a radiant cooling zone having a plurality of vertical tubes lining the inside walls, simultaneously cooling said upflowing hot gas stream to below the maximum safe operating temperature for a downstream energy utilizing means by indirect heat exchange with a coolant flowing in said vertical tubes and solidifying at least partially any remaining ash particles in the gas stream, and removing additional solid matter and slag from said gas stream by gravity, and passing said separated portion of material into said second slag pot; and (4) removing a cleaned gas stream from said radiant cooling zone at a reduced temperature.

2. The process of claim 1 wherein a plurality of said gas-solids impingement separation means are connected in series and/or parallel.

3. The process of claim 1 provided with the step of introducing said portions of solid matter and slag separated in steps 1 and/or 2 into a pool of quench water contained in the bottom of either one or both of said slag pots.

4. The process of claim 1 provided with the steps of passing a stream of bleed gas comprising about 0.5 to 20 vol. % of the hot gas stream from said reaction zone into said first slag pot along with said separated solid matter and slag, and/or passing a stream of bleed gas comprising about 0.5 to 20 vol. % of the hot gas stream from said transfer line through the bottom outlet of at least one said gas-solids impingement separation means along with said separated solid matter and slag and into said second slag pot thereby preventing bridging of said bottom outlet, and removing said bleed gas from said slag pots.

5. The process of claim 1 where in step (2) said hot gas stream from step (1) is introduced into a manifold which communicates with the inlet means to at least one gas-solids impingement separation means by way of a thermally insulated transfer line whose longitudinal central axis makes an angle with the central vertical axis of said separate vertical pressure vessel in the range of about 30° to 120° measured clockwise starting in the third quadrant.

6. The process of claim 1 provided with the additional steps of cooling said portions of solid matter and slag separated in steps (1) and/or (2) by passing the material separated in step (1) through the bottom outlet of said first gas diversion and residue separation chamber and then through a vertical first dip tube that communicates with said first bottom outlet and which terminates below the level of quench water contained in the bottom of said first slag pot, and/or by passing said material separated in step (2) into quench water contained in the bottom of said second slag pot; and wherein at least one of said gas-solids impingement separation means has a vertical dip tube connected to and in communication with its bottom outlet through which material separated by said gas-solids impingement separation means is introduced into said quench water.

7. The process of claim 6 provided with the additional step of passing a first stream of bleed gas comprising about 0 to 20 volume % of the hot gas stream from said first gas diversion and residue separation chamber along with the material separated in step (1) through the bottom outlets of said first gas diversion and residue separation chamber and through said first dip tube into said quench water and/or passing a second stream of bleed gas comprising about 0 to 20 vol. % of the hot gas stream leaving said transfer line in step (2) through the bottom outlet of at least one of said gas-solids impingement separation means along with the material separated in said gas-solids separation means and then through a second dip tube attached to and in communication with said gas-solids impingement separation means into said quench water; and removing cooled first and second streams of bleed gas respectively from said first and second slag pots.

8. The process of claim 1 where in step (2) the hot gas stream leaving the thermally insulated transfer line is passed directly into the inlet means to a multiple-stage gas-solids impingement separation unit comprising a plurality of thermally insulated gas-solids impingement separation means connected in series, and passing the partially cleaned hot gas stream leaving one gas-solids impingement separation means into the next gas-solids separation means in the series; and passing the cleaned hot gas stream leaving the last gas-solids impingement separation means in the series directly up through said radiant cooling zone.

9. The process of claim 8 provided with the additional steps of cooling the solid matter and slag separated in said multiple-stage gas-solids impingement separation unit by passing said separated material into quench water contained in the bottom of said second slag pot.

10. The process of claim 9 wherein at least one of the gas-solids impingement separation means in said multiple-stage gas-solids impingement separation unit has a vertical dip tube connected to and in communication with its bottom outlet, and provided with the step of discharging the portion of material separated by that gas-solids separation means through said dip tube and below the level of the quench water in the second slag pot.

11. The process of claim 10 provided with the additional steps of passing a stream of bleed gas comprising about 0 to 20 vol. % of the hot gas stream leaving said thermally insulated transfer line through the bottom outlet of at least one of the gas-solids impingement separation means with a communicating dip tube in said multiple-stage gas-solids impingement separation unit along with the material separated in said gas-solids impingement separation means, and then through said dip tube into said quench water; and removing a cooled stream of bleed gas from said second slag pot.

12. The process of claim 1 where in step (2) the hot gas stream leaving the thermally insulated transfer line is passed directly into a thermally insulated manifold which is connected to the inlets to a plurality of parallel multiple-stage gas-solids impingement separation units with each unit comprising a plurality of thermally insulated gas-solids impingement separation means connected in series, and passing the cleaned hot gas stream leaving each of the last gas-solids impingement separation means in each unit directly up through said radiant cooling zone.

13. The process of claim 12 or 16 provided with the additional step of introducing into said thermally insulated manifold, the additional hot gas streams produced by a plurality of partial oxidation gas generators.

14. The process of claim 12 wherein said thermally insulated manifold is located either inside or outside of the pressure vessel containing said plurality of gas-solids impingement separation means.

15. The process of claim 1 wherein the solid matter and slag in the hot raw gas streams produced in a plurality of additional partial oxidation gas generators are removed by passing all of said hot raw gas streams through said plurality of thermally insulated gas-solids separation means in step (2).

16. The process of claim 1 where in step (2) the hot gas stream leaving the thermally insulated transfer line is passed directly into a thermally insulated manifold which is in communication with the inlets to a plurality of thermally insulated gas-solids impingement separation means connected in parallel; and passing the cleaned hot gas stream leaving the outlets of said gas-solids impingement separation means directly up through said radiant cooling zone.

17. The process of claim 16 provided with the additional steps of cooling the solid matter and slag separated by said gas-solids impingement separation means by passing said separated material into quench water contained in the bottom of said second slag pot.

18. The process of claim 17 wherein at least one of the gas-solids impingement separation means has a vertical dip tube connected to and in communication with its bottom outlet, and provided with the step of discharging the portion of material separated by that gas-solids impingement separation means through said dip tube and below the level of the quench water in the second slag pot.

19. The process of claim 18 provided with the additional steps of passing a stream of bleed gas comprising about 0 to 20 vol. % of the hot gas stream leaving said thermally insulated transfer line through the bottom exit of at least one of the gas-solids impingement separation means with a communicating dip tube along with the material separated in said gas-solids separation means, and then through said dip tube into said quench water, and removing a cooled stream of bleed gas from said second slag pot.

20. The process of claim 1 wherein said solid carbonaceous fuel is selected from the group consisting of particulate carbon, coal, coke from coal, lignite, petroleum coke, oil shale, tar sands, asphalt, pitch, and mixtures thereof.

21. The process of claim 1 wherein said solid carbonaceous fuel is subjected to partial oxidation either alone or in the presence of substantially thermally liquifiable or vaporizable hydrocarbon or carbonaceous materials and/or water.

22. The process of claim 1 wherein said solid carbonaceous fuel is introduced into the gas generator entrained in a gaseous medium from the group consisting of steam, $CO_2$, nitrogen, synthesis gas, and air.

23. The process of claim 1 wherein a free oxygen containing gas selected from the group consisting of air, substantially pure oxygen and mixtures thereof is employed in said partial oxidation process.

24. The process of claim 1 provided with the step of introducing at least a portion of the cleaned and cooled gas stream from the radiation zone directly into an energy utilizing zone.

25. The process of claim 24 wherein said energy utilizing zone comprises a convection-type gas cooler.

26. The process of claim 24 wherein said energy utilizing zone comprises and expansion turbine for the production of mechanical energy and/or electrical energy.

* * * * *